US011385777B2

(12) United States Patent
Grigore et al.

(10) Patent No.: US 11,385,777 B2
(45) Date of Patent: Jul. 12, 2022

(54) USER INTERFACE (UI) MAPPER FOR ROBOTIC PROCESS AUTOMATION

(71) Applicant: UiPath, Inc., New York, NY (US)

(72) Inventors: Mircea Grigore, Bucharest (RO); Cosmin Voicu, Bucharest (RO)

(73) Assignee: UiPath, Inc., New York, NY (US)

( * ) Notice: Subject to any disclaimer, the term of this patent is extended or adjusted under 35 U.S.C. 154(b) by 45 days.

(21) Appl. No.: 17/019,679

(22) Filed: Sep. 14, 2020

(65) Prior Publication Data

US 2022/0083181 A1 Mar. 17, 2022

(51) Int. Cl.
*G06F 3/0481* (2022.01)
*G06F 3/0484* (2022.01)
*G05B 19/4155* (2006.01)
*G06V 20/00* (2022.01)

(52) U.S. Cl.
CPC ....... *G06F 3/0484* (2013.01); *G05B 19/4155* (2013.01); *G06F 3/0481* (2013.01); *G06V 20/00* (2022.01); *G05B 2219/50391* (2013.01)

(58) Field of Classification Search
None
See application file for complete search history.

(56) References Cited

U.S. PATENT DOCUMENTS

| | | | |
|---|---|---|---|
| 6,823,497 B2* | 11/2004 | Schubert | G06F 30/33 716/106 |
| 8,068,103 B2 | 11/2011 | Zimmer et al. | |
| 9,600,401 B1* | 3/2017 | Haischt | G06F 11/3664 |
| 9,965,139 B2 | 5/2018 | Nychis et al. | |
| 2002/0083097 A1* | 6/2002 | Warrington | G06F 16/958 715/229 |
| 2007/0028162 A1* | 2/2007 | Griffin | G06F 16/958 715/235 |
| 2009/0133000 A1* | 5/2009 | Sweis | G06F 11/3688 717/124 |
| 2009/0273597 A1 | 11/2009 | Chatamballi et al. | |
| 2010/0146420 A1* | 6/2010 | Bharadwaj | G06F 11/3696 715/764 |
| 2011/0239104 A1* | 9/2011 | Prasad | G06F 11/3684 715/234 |

(Continued)

FOREIGN PATENT DOCUMENTS

| | | |
|---|---|---|
| CN | 111221612 A | 6/2020 |
| KR | 102132383 B1 | 7/2020 |
| WO | 2017078705 A1 | 5/2017 |

OTHER PUBLICATIONS

Kataion Spy Web Utility Page available at https://docs.katalon.com/katalon-studio/docs/spy-web-utility.html (last accessed Jul. 27, 2020).

(Continued)

*Primary Examiner* — Henry Orr
(74) *Attorney, Agent, or Firm* — LeonardPatel PC; Michael A. Leonard, II; Sheetal S. Patel

(57) ABSTRACT

A user interface (UI) mapper for robotic process automation (RPA) is disclosed. The UI mapper may initially capture UI elements to fetch UI elements faster for later use and allow an RPA developer to "map" the UI elements for automating an application. This may enable subsequent developers who potentially do not have programming knowledge to build RPA workflows using these predefined "target" UI elements.

18 Claims, 10 Drawing Sheets

(56) References Cited

U.S. PATENT DOCUMENTS

| | | | |
|---|---|---|---|
| 2012/0096340 A1 | 4/2012 | Anbananthan | |
| 2014/0229846 A1* | 8/2014 | Abaya | G06F 3/04847 |
| | | | 715/744 |
| 2015/0339213 A1* | 11/2015 | Lee | G06F 3/0484 |
| | | | 717/125 |
| 2017/0001308 A1* | 1/2017 | Bataller | G06F 3/0484 |
| 2017/0017349 A1 | 1/2017 | Ciano et al. | |
| 2018/0335849 A1 | 11/2018 | Liddell et al. | |
| 2019/0121500 A1 | 4/2019 | Liddell | |
| 2019/0129827 A1 | 5/2019 | Ramasamy et al. | |
| 2020/0050983 A1* | 2/2020 | Balasu | G06F 40/30 |
| 2020/0180155 A1 | 6/2020 | Hall | |
| 2021/0019574 A1* | 1/2021 | Voicu | G06K 9/6263 |
| 2021/0073095 A1* | 3/2021 | Beckett, II | G06F 11/302 |
| 2021/0200560 A1* | 7/2021 | Munteanu | G06F 9/451 |
| 2022/0092607 A1* | 3/2022 | Jeske | G06F 9/45558 |

OTHER PUBLICATIONS

International Search Report and Written Opinion dated Oct. 18, 2021, for PCT Application No. PCT/US21/40662.

\* cited by examiner

USER INTERFACE (UI) MAPPER FOR ROBOTIC PROCESS AUTOMATION

FIELD

The present invention generally relates to robotic process automation (RPA), and more specifically, to a user interface (UI) mapper for RPA.

BACKGROUND

For RPA automation in a user interface (UI), developers typically build descriptors (e.g., selectors) for each UI action. However, initially, there are typically no descriptors or other UI objects. Growing a repository of UI objects organically (i.e., item-by-item, process-by-process, and recording-by-recording) is slow. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to a UI mapper for RPA.

In an embodiment, a computer program for providing a UI mapper configured to map UI elements is embodied on a non-transitory computer-readable medium. The computer program is configured to cause at least one processor to provide an interface facilitating indication of UI elements in a screen of an application. The computer program is also configured to cause the at least one processor to receive one or more indications of the UI elements in the screen and include the one or more indicated UI elements in a UI tree of the application. The UI mapper is configured to operate in a live mode that provides the interface and receives the indications of the UI elements on the screen. The UI mapper is also configured to operate in an offline mode where the UI mapper facilitates selection of different screens.

In another embodiment, a computer-implemented method for mapping UI elements for RPA includes providing an interface facilitating indication of UI elements in a screen of an application, by a UI mapper. The computer-implemented method also includes receiving one or more indications of the UI elements in the screen, by the UI mapper, and including the one or more indicated UI elements in a UI tree of the application, by the UI mapper. The computer-implemented method further includes adding the one or more indicated UI elements to an object repository for subsequent reuse, by the UI mapper or a UI object browser. The UI mapper includes a UI descriptors pane organized by one or more applications, one or more respective screens per application, and one or more respective UI elements per screen that are included in the UI tree.

In yet another embodiment, a computer program for providing a UI mapper configured to map UI elements is embodied on a non-transitory computer-readable medium. The computer program is configured to cause at least one processor to provide an interface facilitating indication of UI elements in a screen of an application. The computer program is also configured to cause the at least one processor to receive one or more indications of the UI elements in the screen and include the one or more indicated UI elements in a UI tree of the application. The computer program is further configured to cause the at least one processor to display a properties pane comprising properties of a selected application, screen, or UI element. When a UI element is selected, the properties pane includes properties of a target UI element and one or more UI descriptors for identifying the target UI element.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
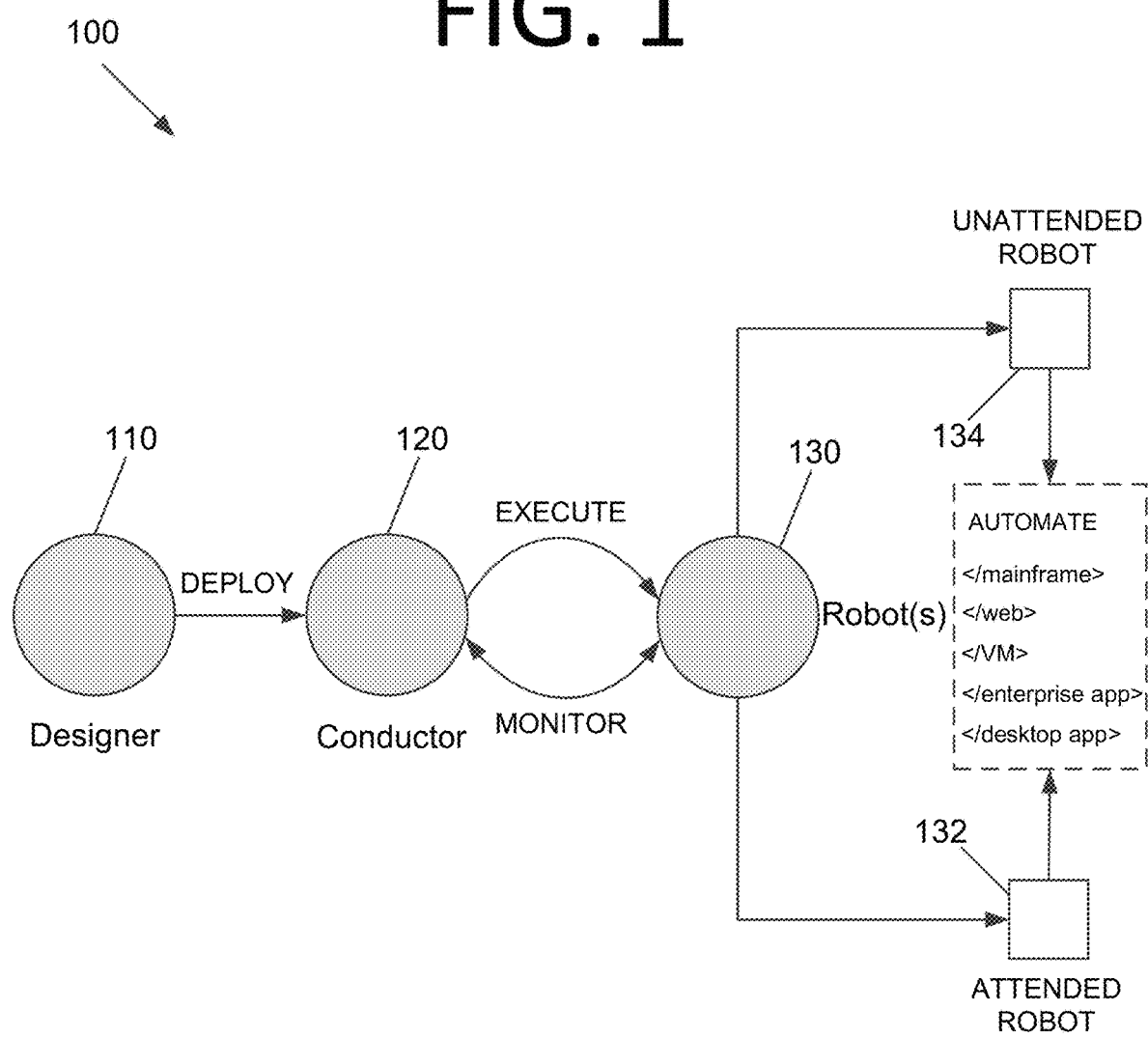
FIG. 1 is an architectural diagram illustrating a robotic process automation (RPA) system, according to an embodiment of the present invention.

Some embodiments pertain to a UI mapper for RPA. The UI mapper may initially capture UI elements to fetch UI elements faster for later use. The UI mapper may allow an RPA developer to "map" the UI elements for automating an application such that subsequent developers who potentially do not have programming knowledge may build RPA workflows using these predefined "target" UI elements.

UI elements on the screen (e.g., text fields, buttons, labels, menus, checkboxes, etc.) can be grouped by applications, application versions, application screens, and collections of UI elements. Each screen typically has multiple UI elements. As used herein, a "screen" refers to a certain state of an application. This state may have a certain image or look at a certain point in time, but a hierarchical structure of elements may exist "under the hood," such as UI elements, containers, etc.). An "application" or a version of a given application may be a union of screens in this context. Each UI element may be described by one or more UI descriptors in some embodiments.

The UI elements, applications, and application screens are UI objects. The UI elements, applications, and application screens may have a certain ordered structure in some embodiments. For instance, applications may contain application screens, and application screens may contain UI elements. In some embodiments, an application can have multiple application screens, and each screen may have multiple UI elements. In some embodiments, UI elements and screens may be further differentiated into specific types of UI elements (e.g., buttons, checkboxes, text fields, etc.) and screens (e.g., top windows, modal windows, popup windows, etc.).

A UI object browser may access libraries of UI objects that may be grouped by applications, application versions, application screens, collections of UI elements, a combination thereof, etc. The UI object libraries may be stored in a UI object repository in some embodiments. As used herein, the UI object repository is a collection of UI object libraries. In some embodiments, the UI object repository may be a NuGet™ feed, a web service, etc.

The UI object browser may be used in some embodiments for navigating, managing, and editing UI object libraries in the UI object repository. The UI object repository of UI object libraries in some embodiments may facilitate the managing, reusing, and increasing the reliability of UI descriptors in a project. UI descriptors may be added to UI libraries and be published or republished for global reuse in a UI object repository in some embodiments. The UI object browser, by providing access to the UI object repository and its UI object libraries, may facilitate reusability of UI element identification frameworks and derivatives thereof.

To make UI objects reusable, they may be extracted into UI object libraries that can be referenced by RPA processes. When selectors or other UI descriptors are modified due to a new version of an application, for example, the library may be recreated (or republished) to include the modified UI descriptors. RPA processes using the UI object library may then call the modified UI descriptor versions. References to the new application programming interface (API) associated with the new library may be manually modified for an RPA process by a developer, modified via a software tool (e.g., a tool that goes through an RPA process and updates UI descriptor references when selectors or other components thereof change), or modified automatically by any suitable mechanism in some embodiments.

In some embodiments, packages of UI objects may be attached as a dependency (e.g., NuGet™ packages). However, in certain embodiments, the UI objects may be obtained via one or more API calls to a web service. This enables the UI objects to be stored remotely and retrieved and used during the automation.

UI elements added to UI object libraries may represent selectors for use in RPA workflows. To automate specific actions in the UI, the RPA robot may interact with various windows, buttons, drop-down lists, and/or other graphical elements. Conventionally, this is done using the expected screen positions of UI elements. However, this is not dependable.

Some embodiments use selectors that overcome the problems associated with fixed coordinate identification by storing the attributes of a UI element and its parents in an Extensible Markup Language (XML) fragment. While selectors may be automatically generated in some embodiments where the UI is static, some software programs, such as some web applications, have changing layouts and attribute nodes with volatile values. These changes may not be readily predictable, and this previously required manual generation of some selectors. However, the object browser of some embodiments may overcome this issue.

Selectors are a type of UI descriptor that may be used to detect UI elements in some embodiments. A selector has the following structure in some embodiments:

<node_1/><node_2/> . . . <node_N/>

The last node represents the GUI element of interest, and all previous nodes represent the parents of that element. <node_1> is usually referred to as a root node and represents the top window of the application.

Each node may have one or more attributes that assist with correct identification of a specific level of the selected application. Each node has the following format in some embodiments:

<ui_system  attr_name_1='attr_value_1'  . . . attr_name_N='attr_value_N'/>

Every attribute may have an assigned value, and attributes with constant values may be selected. This is because changes to the value of an attribute each time the application is started may lead to the selector not being able to correctly identify the associated element.

UI object library descriptors may be added directly to an RPA workflow activity, saving developer time that may otherwise be required to create a custom selector for the activity. The object browser may provide a database storing created selectors in object libraries to enable the reusability of UI descriptors. An object library is defined herein as a collection of UI descriptors corresponding to one or more screens from a certain version of an application. A UI descriptor is a set of instructions for finding a UI element. UI descriptors in some embodiments are an encapsulated data/struct format that includes UI element selector(s), anchor selector(s), computer vision (CV) descriptor(s), unified target descriptor(s), a screen image capture (context), an element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention. A unified target descriptor chains together multiple types of UI descriptors. A unified target descriptor may function like a finite state machine (FSM), where in a first context, a first UI descriptor mechanism is applied, in a second context, a second UI descriptor is applied, etc.

In some embodiments, an RPA designer application may ask the user what type(s) of applications the user plans to automate. For instance, the user may specify Excel®, Workday®, SAP®, etc. The application may be programmed with logic regarding how to automate these applications since the RPA application already contains screen descriptors in UI object libraries for those applications. Out of the box selectors for various versions of these applications may be available, and the user may be able to designate version(s) to automate.

In some embodiments, fuzzy matching may be employed, where one or more attributes should match with a certain accuracy (e.g., a 70% match, an 80% match, a 99% match, etc.), within a certain range, using string metrics (e.g., a Levenshtein distance, a Hamming distance, a Jaro-Winkler distance, etc.), a combination thereof, etc. One of ordinary skill in the art will appreciate that the similarity measure may quantify an amount of similarity, as well as an amount of mismatch between two attribute values. Furthermore, in various embodiments, the similarity threshold may represent a maximum amount of mismatch or a minimum amount of similarity required for a match.

Depending on the chosen manner of computing the similarity measure, the similarity threshold can have various interpretations. For instance, the similarity threshold may indicate a maximum count of characters that can differ between the two strings or a fractional degree of mismatch calculated as a proportion of the total count of characters (e.g., combined string length). In some embodiments, the similarity threshold may be re-scaled to a predetermined interval, such as between 0 and 1, between 0 and 100, between 7 and 34, etc. In one nonlimiting example, a relatively high similarity threshold (e.g., close to 1 or 100%) indicates a requirement for an almost exact match, i.e., the value of the fuzzy attribute in the runtime target is only allowed to depart very slightly from the value of the respective attribute in the design time target. In contrast, when the similarity threshold is relatively low (e.g., close to 0), almost any values of the respective fuzzy attribute are considered as matching.

In certain embodiments, the matching tolerance may differ on a per-attribute basis. For instance, an exact match may be required for one or more attributes (e.g., it may be desired to find a certain exact name) and fuzzy matching may be performed for one or more other attributes. The number and/or type of attributes used from each graphical element detection technique may be custom-specified by the RPA developer in some embodiments.

In some embodiments, attributes may be stored as attribute-value pairs and/or attribute-value-tolerance pairs (e.g., fuzzy matching). Attribute-value pairs may indicate a name and a type of UI element represented by the respective node in some embodiments. However, one skilled in the art will appreciate that there may be multiple ways to represent a location of a specific node within a UI tree other than a list of attribute-value pairs without deviating from the scope of the invention.

These attribute-value pairs and/or attribute-value-tolerance pairs may be stored in a tag in some embodiments, and each tag may include a sequence of characters with the sequence book-ended by implementation-specific delimiters (e.g., beginning with "<" and ending with "/>"). Attribute-value pairs may indicate a name and a type of UI element represented by the respective node in some embodiments. However, one skilled in the art will appreciate that there may be multiple ways to represent a location of a specific node within a UI tree other than a list of attribute-value pairs without deviating from the scope of the invention.

To enable a successful and ideally unambiguous identification by an RPA robot, some embodiments represent each UI element using an element ID characterizing the respective UI element. The element ID in some embodiments indicates a location of a target node within a UI tree, where the target node represents the respective UI element. For instance, the element ID may identify a target node/UI element as a member of a selected subset of nodes. The selected subset of nodes may form a genealogy, i.e., a line of descent through the UI tree where each node is either an ancestor or a descendant of another node.

In some embodiments, the element ID includes an ordered sequence of node indicators, the sequence tracing a genealogical path through the UI tree, and the path ending in the respective target node/UI element. Each node indicator may represent a member of an object hierarchy of the respective UI and its position within the sequence consistent with the respective hierarchy. For instance, each member of the sequence may represent a descendant (e.g., a child node) of the previous member, and may have the following member as a descendant (e.g., a child node). In one HyperText Markup Language (HTML) example, an element ID representing an individual form field may indicate that the respective form field is a child of an HTML form, which in turn is a child of a specific section of a webpage, etc. The genealogy does not need to be complete in some embodiments.

Some embodiments may use one or more multi-anchor matching attributes. Anchors are other UI elements that can be used to assist in uniquely identifying a target UI element. For instance, if multiple text fields are included in a UI, searching for a text field alone is insufficient to uniquely identify a given text field. Accordingly, some embodiments look for additional information in order to uniquely identify a given UI element. Using the text field example, a text field for entering a first name may appear to the right of the label "First Name". This first name label may be set as an "anchor" to help to uniquely identify the text field, which is the "target".

Various positional and/or geometric associations between the target and the anchor may be used in some embodiments, potentially within one or more tolerances, to uniquely identify the target. For instance, the center of bounding boxes for the anchor and the target may be used to define a line segment. This line segment could then be required to have a certain length within a tolerance and/or slope within a tolerance to uniquely identify the target using the target/anchor pair. However, any desired position of the location associated with the target and/or anchors may be used in some embodiments without deviating from the scope of the invention. For instance, the point for drawing line segments may be in the center, upper left corner, upper right corner, lower left corner, lower right corner, any other location on the border of the bounding box, any location within the bounding box, a location outside of the bounding box as identified in relation to the bounding box properties, etc. In certain embodiments, the target and one or more anchors may have different locations within or outside of their bounding boxes that are used for geometric matching.

Per the above, a single anchor may not always be sufficient to uniquely identify a target element on a screen with a certain confidence. For instance, consider a web form where two text field for entering a first name appear to the right of respective labels "First Name" in different locations on the screen. In this example, one or more additional anchors may be useful to uniquely identify a given target. The geometric properties between the anchors and the target (e.g., line segment lengths, angles, and/or relative locations with tolerances) may be used to uniquely identify the target. The user may be required to continue to add anchors until a match strength for the target exceeds the threshold.

As used herein, the terms "user" and "developer" are used interchangeably. The user/developer may or may not have programming and/or technical knowledge. For instance, in some embodiments, the user/developer may create RPA workflows by configuring activities in the RPA workflow without manual coding. In certain embodiments, this may be done by clicking and dragging and dropping various features, for example.

UI descriptors may be extracted from activities in an RPA workflow and added to a structured schema that groups the UI descriptors by UI applications, screens, and UI elements. UI descriptors may be part of one project for wide reuse, part of global repositories for testing purposes, or part of UI object libraries for global cross-project sharing in some embodiments. An object library in some embodiments is an encapsulation of UI descriptors grouped by applications, application versions, and screens. UI descriptors can be defined and added to the object library, which can be installed in other projects as dependencies after publishing in some embodiments. This makes the object library of UI descriptors available for reuse. A UI application in some embodiments is a targeted application that has multiple versions where each version has multiple screens.

The UI object repository and UI descriptor reuse may be beneficial for a variety of reasons. For instance, if the location, appearance, and/or functionality of a UI element in an application changes, the UI descriptor may be changed, and the change may then be propagated to activities using the UI descriptor. Thus, reusability may be provided at the level of identifying graphical elements in a UI.

This may be especially beneficial for accommodating new versions of applications. For a new version, a software developer may only need to update UI descriptors and/or develop a few new selectors from scratch, substantially reducing development time. For a webpage, for instance, HyperText Markup Language (HTML) may be inspected to obtain paths to UI elements for the corresponding selectors. Selectors for corresponding UI elements may be different in different web browsers and/or different versions of the same web browser. This concept may and also apply to visual desktop, server, smart phone, and tablet applications. UI object libraries may contain the actual selectors for the application, which is just one type of UI descriptor, per the above. A UI object library may have multiple UI descriptors of different types for one or more applications. UI descriptors may also refer to different technologies with which the application is built. For instance, different UI descriptors may be created and used for standalone desktop, web, and mobile applications. For one technology, you may want to use selectors, for another, you may want to use CV descriptors, etc.

The UI descriptors may work with a unified target that encompasses all UI detection mechanisms through which image detection and definition are performed in some embodiments. The unified target may merge multiple techniques of identifying and automating UI elements into a single cohesive approach. The unified target may prioritize selector-based and driver-based UI detection mechanisms and fallback on CV to find an image if the first two mechanisms are not successful. A selector editor and UI explorer may be configured to support the unified target in some embodiments.

In some embodiments, the designer application includes a section or a panel as an "object browser" that loads object libraries from one or more sources. This object browser may allow a user to visualize the entire UI object set and use any of the UI descriptors via drag and drop and wizards or contextual actions. This may allow the user to choose an action to be performed in an RPA workflow activity, such as click, get text, type into, etc.

An example of an object library structure is provided below.

- SAP
  - version 1
    - screen 1
      - object 1
      - object 2

- ...
  - screen 2 ...
  - ...
- version 2 ...
- ...
- Salesforce ...
- ...

It should be noted that the hierarchy above is provided by way of example only. Any desired number of levels in the hierarchy and elements associated with each level may be used without deviating from the scope of the invention. In certain embodiments, the user can define the application map as he or she desires. Moreover, some nodes in the tree may only serve a management role and not a functional one in some embodiments. For instance, UI elements may be grouped together into a container that does not have UI descriptors. The container may exist for the purpose of grouping only in some embodiments.

In some embodiments, when an OLDB is configured in UiPath Studio™, for example, "indicate on screen" may look into the OLDB and pick up the UI descriptor, if available. If the UI descriptor is not available, the UI descriptor may be defined by the user by indicating the missing UI elements. The UI descriptor may then be generated and published in a UI object library.

Usage of the UI descriptors and UI object repository in some embodiments creates relationships and data that can be further expanded on. The UI steps from the automation process can be mapped to a single screen in some embodiments. For example, a screen that contains a form where the user adds and retrieves some data and then hits submit can be documented with a single screenshot that contains the screen capture and each UI step performed on that screen, such as: (1) copied amount; (2) copied number; (3) added name; and (4) clicked "OK."

User Interface (UI) Mapper

If a given screen has a large number of different UI elements, it may take some time to fetch them one-by-one for each screen. Accordingly, some embodiments employ a UI mapper that captures multiple UI objects from a screen of an application in one pass. This may allow fetching of UI objects for subsequent screens to occur faster. In some embodiments, computer vision (CV) may be used to automatically capture screens to the object repository, and the UI mapper may be used to add UI elements from the screens to the object repository.

In the first phase, users may capture UI elements manually and/or computer vision (CV) may be used to detect UI elements on the screen and suggest them to the user. The user may manage the UI elements by reordering them, grouping them into windows, providing UI element scopes other than at the screen level, etc. With respect to using other UI element scopes, situations may arise where a user does not want to use the entire application screen, but rather, one or more containers of grouped components thereof. For instance, a container may be an individual pane within a screen, a menu dropdown, etc.

In some embodiments, the UI Mapper is a tool that allows RPA developers to rapidly build a repository of UI objects and arrange them in a hierarchy of applications and screens so the UI objects can be readily used in subsequent automations. In some embodiments, the UI mapper may be started from an object browser toolbar. From a high-level perspective, the UI mapper tool is a combination of an object browser with a selection screen. The object browser may be used as a library/tree for organizational purposes, while the selection screen and property pane (a.k.a., "helper") is used to configure individual targets. Adding objects into the repository can be done either in bulk or individually in some embodiments. Both techniques may allow editing of advanced settings of the UI objects. In some embodiments, users may be able to add applications, screens, and other organizational groupings, add UI elements in bulk or one-by-one, delete UI objects (e.g., UI elements, screens, applications, groups, etc.), edit existing UI elements (e.g., add/remove anchors, edit selectors, etc.), highlight UI elements (e.g., one UI element, multiple UI elements, all UI elements, etc.), interact with a target application, etc.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments or on physical machines, and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
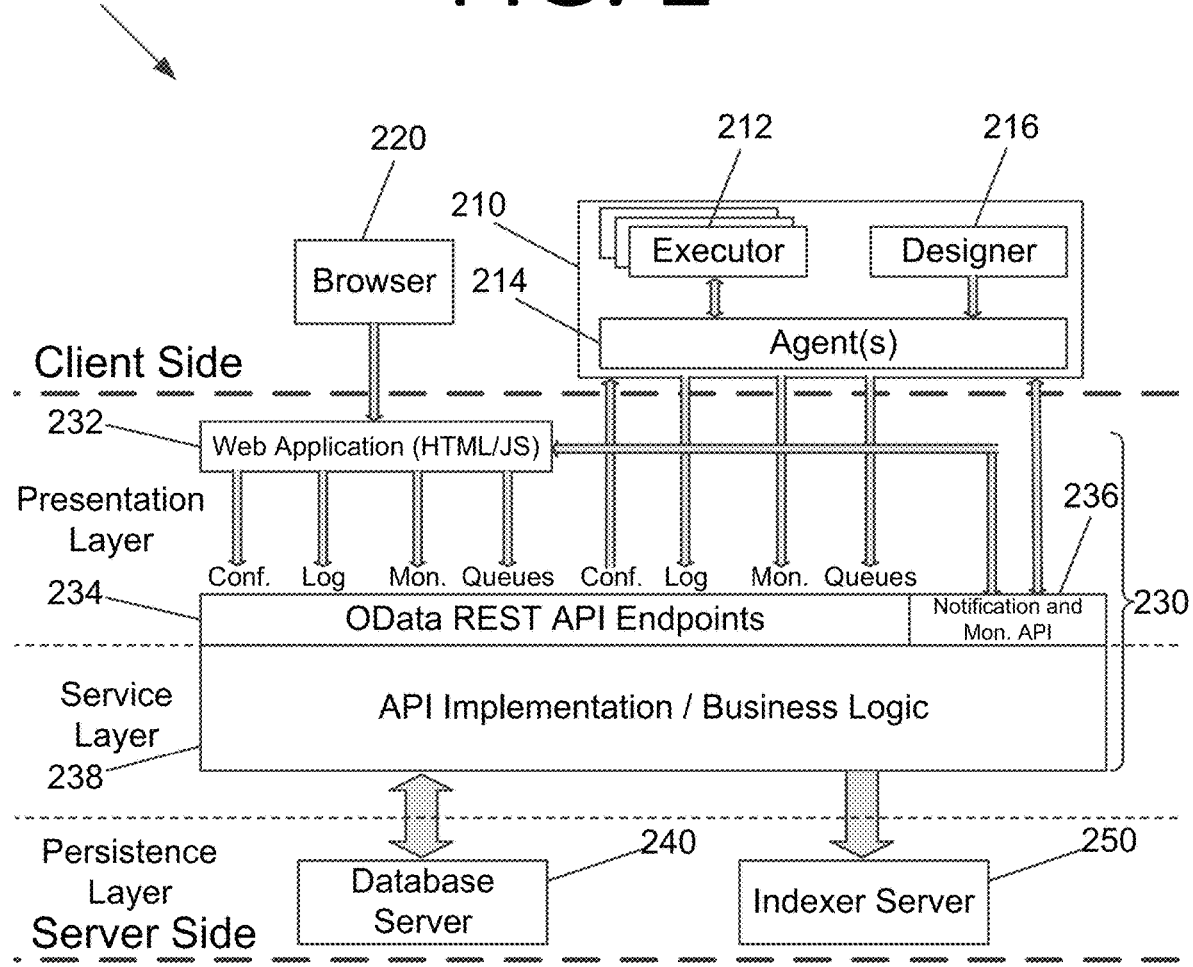
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
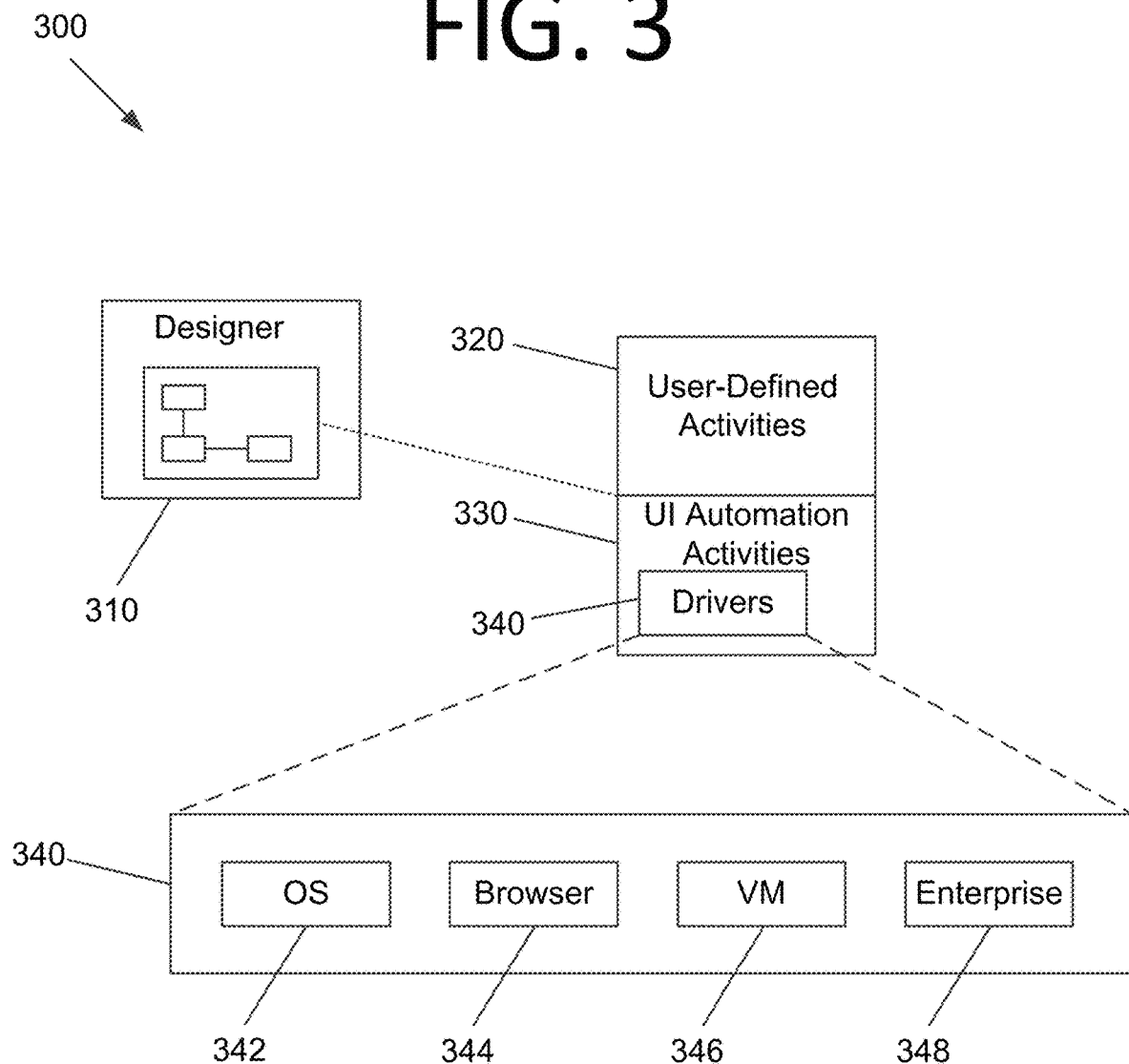
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with applications through the UI layer. In certain embodiments, UI automation activities 300 may simulate" user input through window messages or the like, for example. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
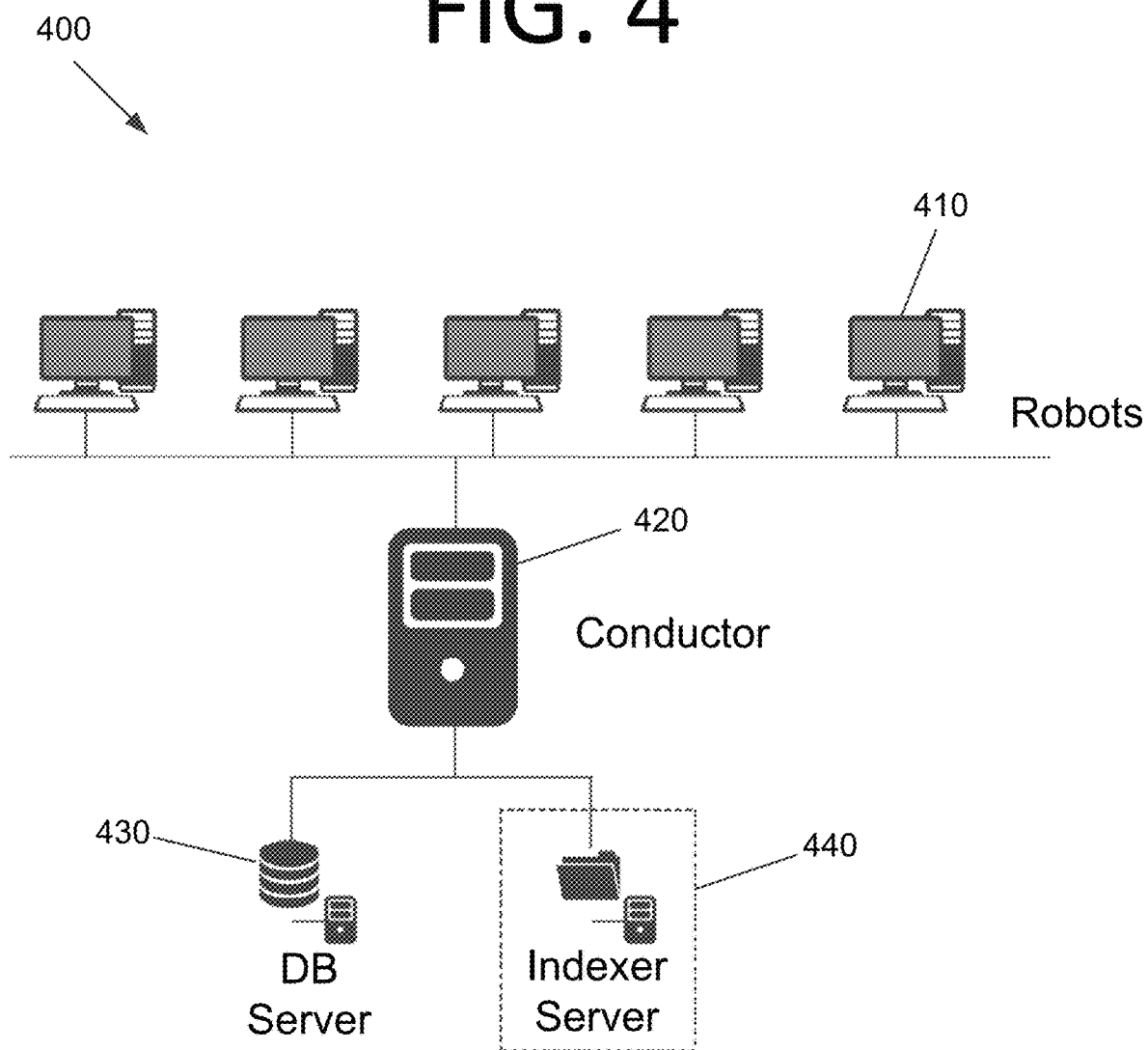
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client and/or server software may be used without deviating from the scope of the invention. For instance, the conductor may run a server-side application that communicates with non-web-based client software applications on the client computing systems.

Figure 5:
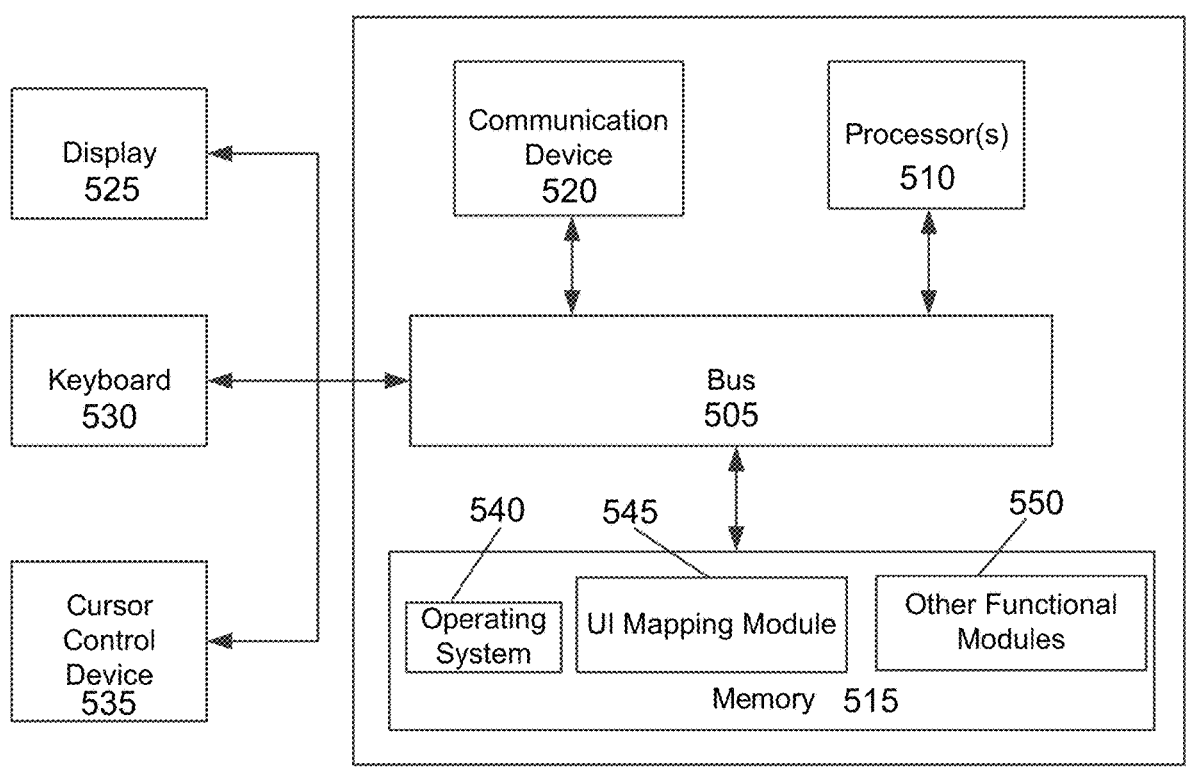
FIG. 5 is an architectural diagram illustrating a computing system configured to provide a UI mapper for RPA, according to an embodiment of the present invention.

FIG. 5 is an architectural diagram illustrating a computing system 500 configured to provide a UI mapper for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a UI mapping module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In some embodiments, the UI mapper operates in a live mode (also called "recorder mode" herein) or an offline mode (also called "navigate mode" herein). Live mode and offline mode may be mutually exclusive since offline mode allows a user to navigate between recorded screens of an application and live mode allows the user to indicate UI elements of a given screen. In some embodiments, when in offline mode, the live application screen and its overlay may be stopped and/or hidden. This functionality is described in further detail with respect to FIGS. 6A-D below.

Figure 6A:
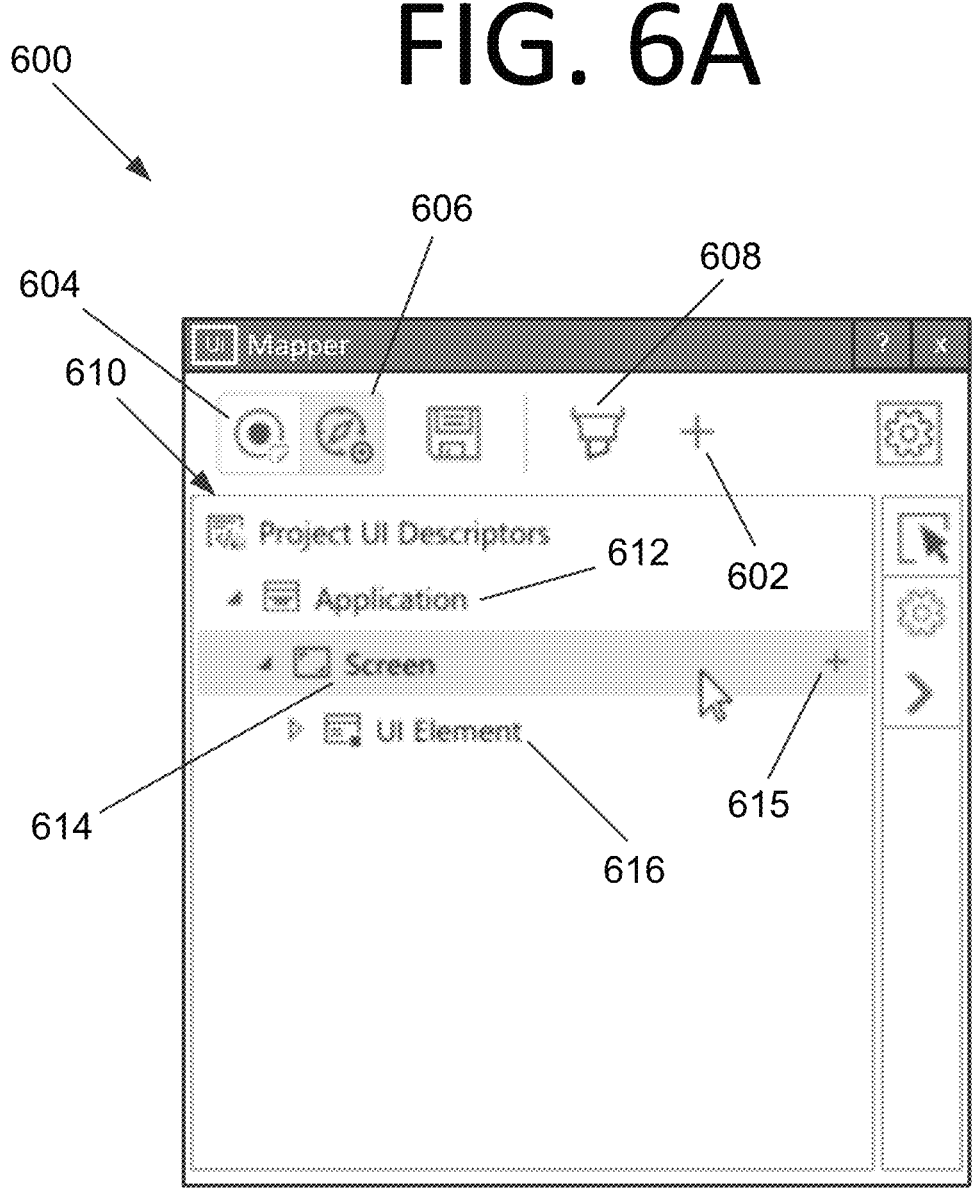
FIG. 6A illustrates a UI mapper in collapsed mode, according to an embodiment of the present invention.

FIG. 6A illustrates a UI mapper 600 in collapsed mode, according to an embodiment of the present invention. UI mapper 600 may be launched from a UI object browser of an RPA designer application in some embodiments. UI mapper 600 includes a project UI descriptors pane 610 with a UI tree structure organized by applications 612, screens 614, and UI elements 616. In some embodiments, new applications and screens can be added from a toolbar button, by clicking an add button, or both. For instance, if the user clicks on add button 602 or a hover-only add button (+) associated with a given tree item (e.g., add button 615), the associated application or screen may be added.

In this embodiment, a single application 612, screen 614, and UI element is shown. However, any number of applications, screens, and UI elements may be used and organized based on the nature of the application without deviating from the scope of the invention. Where other UI element scopes are designated, such as a pane of UI elements, this container may appear as a child of the application or a screen. Where a screen is used for UI elements that are used by multiple screens, this general screen may also appear at its own level in the tree or at the same level as the other screens.

Figure 6B:
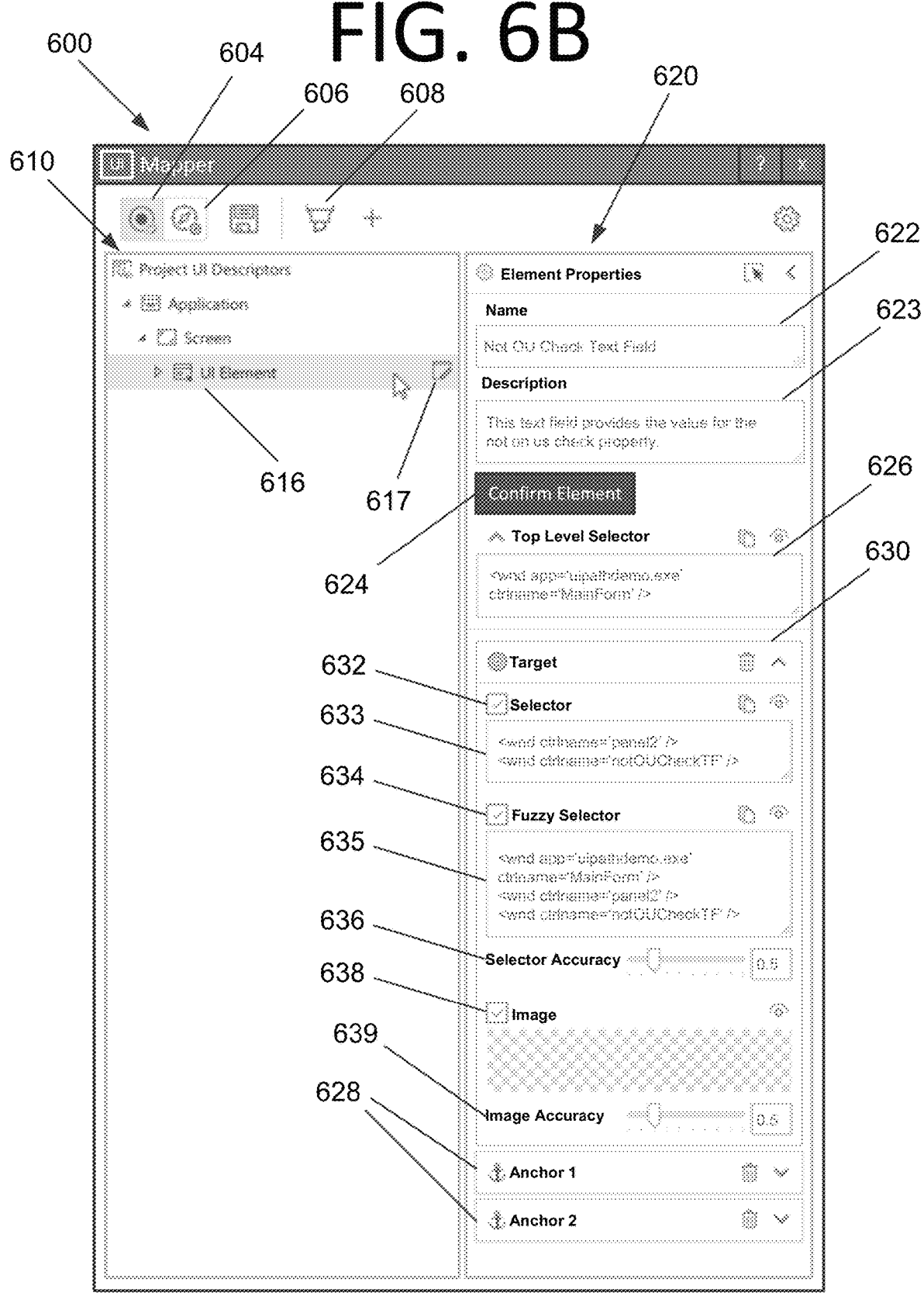
FIG. 6B illustrates the UI mapper in expanded mode, according to an embodiment of the present invention.

If a new application is selected, a new application and screen may then be created in a UI tree in the appropriate location and UI element properties may be shown in a properties pane (see, e.g., properties pane 620 of FIG. 6B).

The "Name" field (e.g., name field 622 of FIG. 6B) may be prefilled based on the name of the component in selector information, for example, and may be editable by the user. Selecting a new application may simultaneously start a "live" mode for the application in some embodiments where the user can indicate UI elements in an application screen. See FIGS. 6B-D, for example.

After indicating an application, the application path and arguments, if applicable, may be collected and stored, and a new screen is created containing the runtime data. This may include the application path and arguments (e.g., the file name and path to open the application with that specific file) and the selector, for example. This set of information may be used to create a screen.

In some embodiments, new independent screens may also be created after indicating the application, but without creating an application in the UI tree. Consider the case where a user wishes to have screens that do not belong to a specific application and/or have UI elements that do not belong to a specific screen. For instance, if a certain button appears in multiple screens or other application states, it may not make sense to have separate UI descriptor instances of an identical button in all such screens. The user may designate such a button as a UI element inside a general screen that is not for a certain application state.

In the embodiment of FIGS. 6A and 6B, there are two editing modes—live mode and offline mode. In FIG. 6A, UI mapper 600 is in offline mode and in FIG. 6B, UI mapper 600 is in live mode. These modes allow users to add new elements and modify existing ones. Live mode (also called "recorder mode" herein) may be invoked via recorder mode button 604, which disables navigate button 606. Conversely, clicking navigate button 606 disables recorder mode button 604 and allows the user to operate in offline mode. The main difference between live mode and offline mode in this embodiment is that in live mode, the application itself cannot be operated since the interaction would just add UI elements to the repository, whereas in navigate mode, the interaction is sent to the application, so new UI elements cannot be added by indicating them in the application.

Figure 6C:
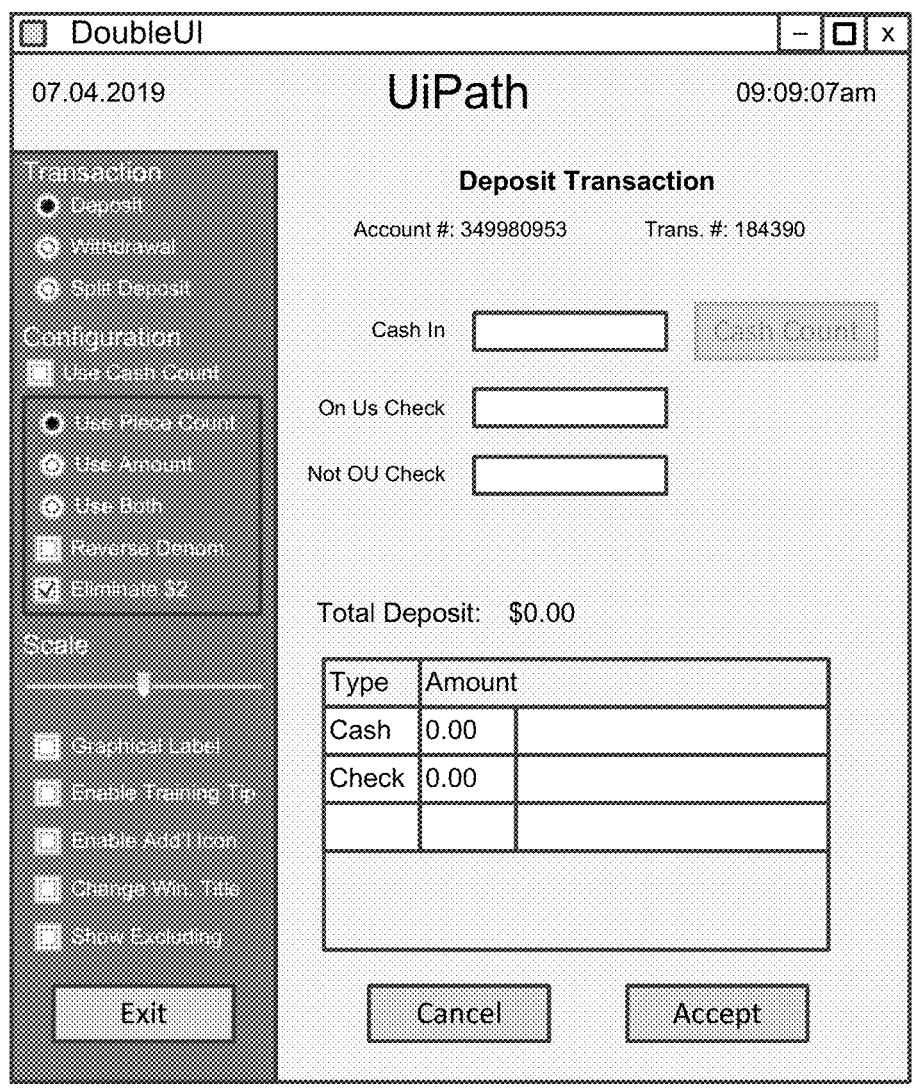
FIG. 6C illustrates a live application screen with no UI elements selected, according to an embodiment of the present invention.
Figure 6D:
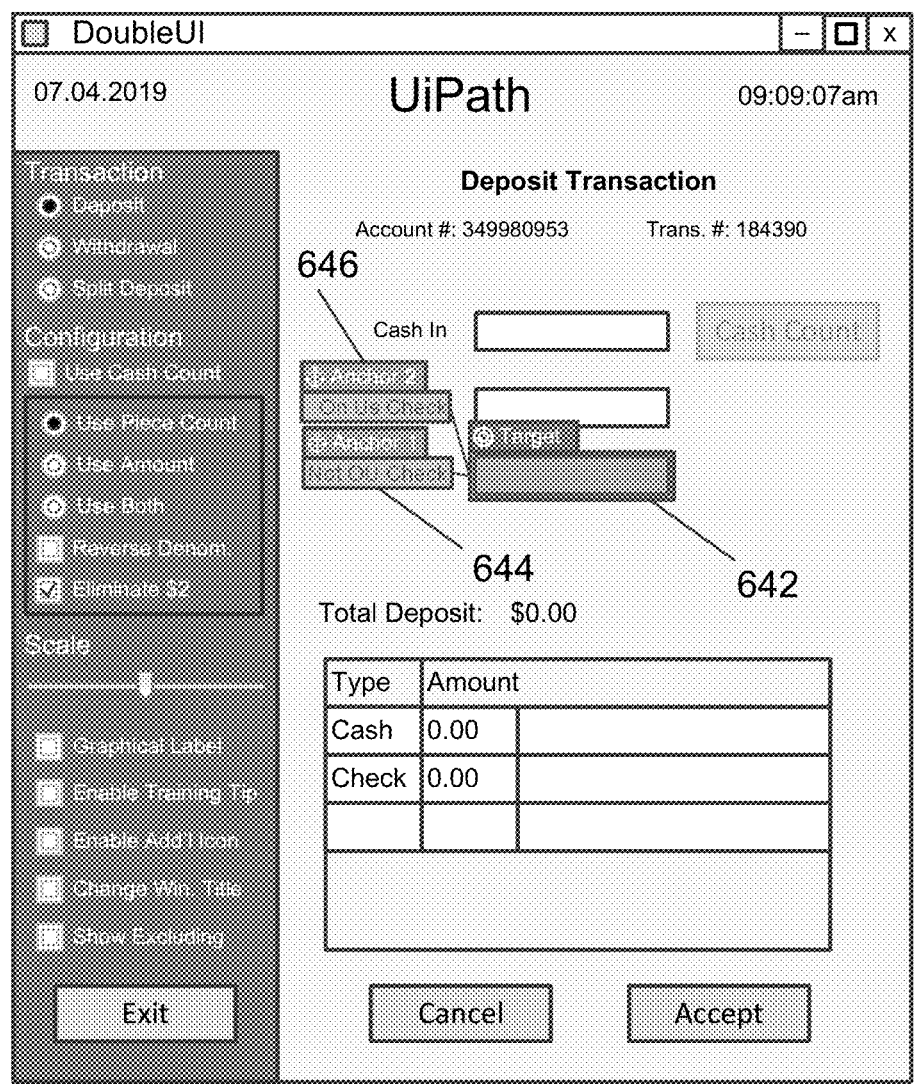
FIG. 6D illustrates the live application screen after target and anchor UI elements have been selected, according to an embodiment of the present invention.

Turning to FIG. 6B-D, in recorder mode, indicate functionality is initiated for live application screen 640. As can be seen in FIGS. 6C and 6D, live application screen 640 includes various options configured by checkboxes and radio buttons, as well as text fields. Initially, no UI elements are indicated in live application screen 640. See FIG. 6C. Users may capture the UI elements manually by clicking on them and providing UI descriptor information, or CV can be used to attempt to identify the UI elements automatically and provide suggestions to the user. For instance, CV may suggest visible elements to capture, such as buttons, form fields, drop down menus, etc.

Turning to FIG. 6D, the user selects a target UI element 642 and two anchors 644, 646 to uniquely identify target UI element 642 using a multi-anchor approach. After target UI element 642 is indicated, the properties of target UI element 642 may be added and displayed to the user in properties pane 620 when the user hovers over and clicks an edit button 617, for example. In this embodiment, the properties include a UI element name 622, description 623, top level selector 626, target properties 630 and anchor properties 628. Expanding anchor properties 628 may show a similar set of UI descriptor options for finding the respective anchor to target properties 630 in some embodiments.

Target properties 630 include checkboxes 632, 634, 638 for selecting the UI element detection technique(s) that are desired, i.e., selector, fuzzy selector, and image matching, respectively, in this embodiment. The user may manually modify attributes for the selector and fuzzy selector techniques using text areas 633, 635, respectively. The user can modify selector accuracy 636 using a slider or by manually entering a value. Image accuracy 639 can also be modified using a respective slider or by manually entering a value.

Using properties pane 620, the user can modify various properties for the respective UI element including, but not limited to, removing anchors, deleting the target, editing selectors, editing the UI element name and description, etc. In some embodiments, the UI mapper needs to be in live mode for the user to add anchors. Using project UI descriptors pane 610, the user can move a currently selected UI element 616 to a different position in the tree hierarchy. When done configuring a UI element, the user can click on a confirm element button 624 that resumes the recording process to capture the next desired UI element and/or screen.

In some embodiments, the user can click any desired UI element 616 in the UI tree of project UI descriptors pane 610. If valid (e.g., the UI descriptor(s) were able to find the target UI element in the live application screen), the target UI element may be highlighted on live application screen 640, as shown in FIG. 6D, and the settings of the UI element can be further edited as desired. If the target UI element is not valid, in some embodiments, the properties of the target UI element are still displayed and can be edited, but new elements (target/anchors) cannot be added until the error(s) are corrected. If edits are performed, validation may also be performed again.

The user may also click in a screen 614 in the UI tree. There may be no visual response for this action in some embodiments, but the next elements that are added may be added to the selected screen rather than the previous screen. UI elements, screens, and applications may be deleted in some embodiments by right-clicking on the respective element and choosing a delete option (not shown). Users can stop recording by clicking navigate button 606 in the toolbar.

Offline editing in the navigate (offline) mode of FIG. 6A may be similar to the live mode of FIG. 6B, except highlighting and live validation of elements in live application screen 640 and adding of anchors may not be performed. Properties pane 620 may enable manual editing of the properties shown in FIG. 6B in navigate mode as well. The user can switch back to live mode via recorder mode button 604.

Highlighting elements may be performed using a highlight button 608. This can be initiated for a single UI element or all UI elements in some embodiments. For a single UI element, since highlighting a UI element may imply searching for it, this action may switch the mode from navigate mode to recording mode. The UI element of interest may be automatically highlighted in live application screen 640.

If a user highlights a screen, all UI elements in the screen may be searched and targets may be highlighted. For screens, highlight button 608 may behave like a toggle button, where it stays on until the user presses it again. In this state, users may switch to recording mode and add/edit other UI elements, if so desired. During the search for elements, a cancelable "toaster" may be displayed, and each UI element may be displayed when found rather than waiting until the end of the process.

Figure 7:
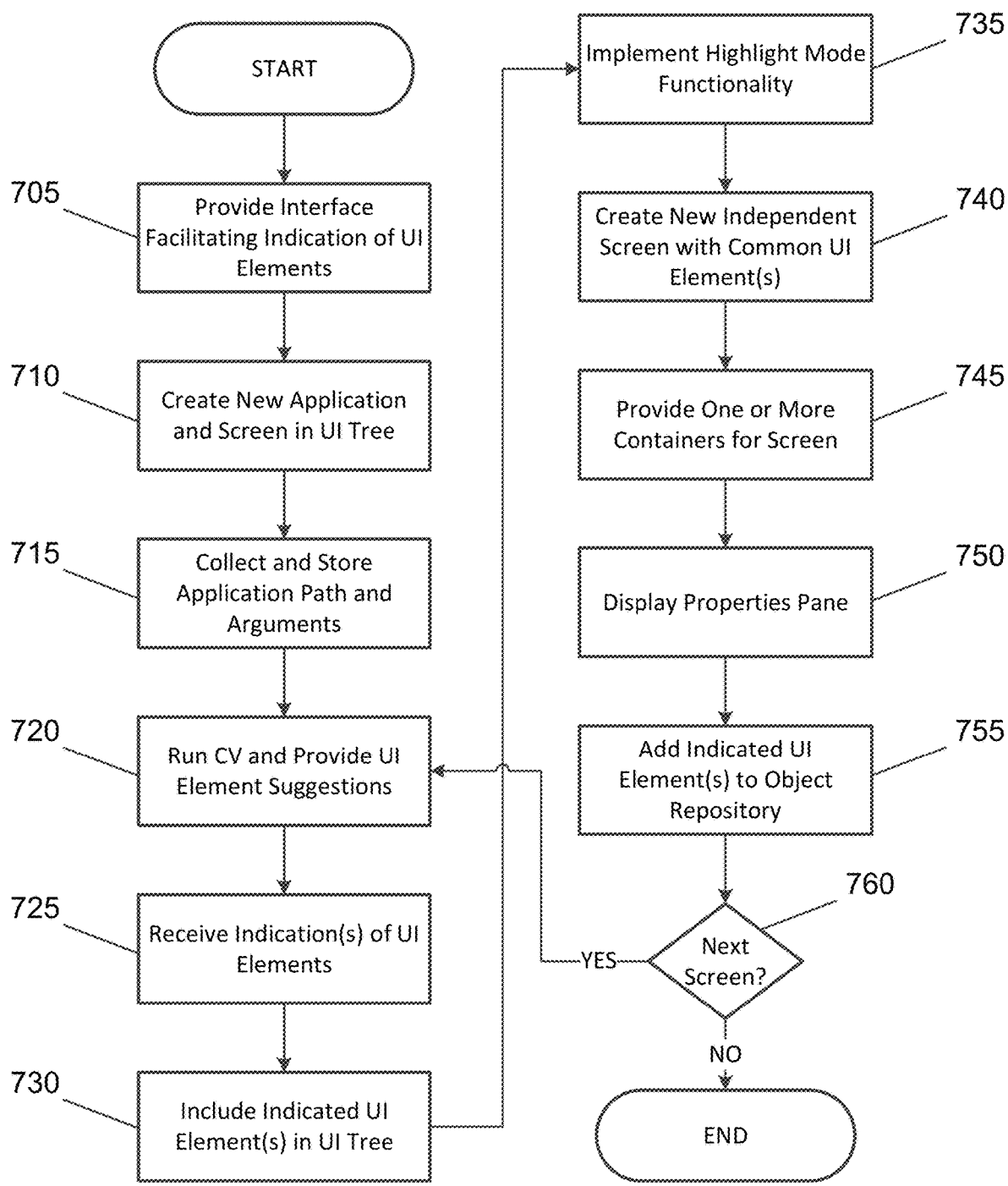
FIG. 7 is a flowchart illustrating a process for a UI mapper, according to an embodiment of the present invention.

FIG. 7 is a flowchart illustrating a process 700 for a UI mapper, according to an embodiment of the present invention. The process begins with providing an interface facilitating indication of UI elements in a screen of an application at 705. A new application and screen are created in a UI tree when a user selects a new application at 710 and an application path and arguments for the application are collected and stored at 715.

CV is run on the screen to automatically identify UI elements and one or more UI element suggestions are provided using the automatically identified UI elements at 720. One or more indications of the UI elements in the screen are received at 725 and the one or more indicated UI elements are included in the UI tree of the application at 730.

In some embodiments, the UI mapper is configured to operate in a recorder mode that provides the interface and receives the indications of the UI elements on the screen. In certain embodiments, The UI mapper is configured to operate in a navigate mode where the UI mapper facilitates selection of different screens. In some embodiments, the UI mapper is configured to operate in both modes. The recorder mode and the navigate mode are mutually exclusive in certain embodiments.

In some embodiments, the UI mapper is launched from a UI object browser of an RPA designer application. In certain embodiments, the UI mapper includes a UI descriptors pane organized by one or more applications, one or more respective screens per application, and one or more respective UI elements per screen that are included in the UI tree. In some embodiments, when a UI element is selected, the properties pane includes properties of a target UI element and one or more UI descriptors for identifying the target UI element. In certain embodiments, the properties pane further includes at least one anchor associated with the target UI element. In some embodiments, the UI mapper, via the properties pane, is configured to facilitate removing anchors, deleting the target UI element, editing the one or more UI descriptors, editing a name and description of the target UI element, or a combination thereof.

Some embodiments implement highlight mode functionality at 735 if a user wants to search for a selected UI element on the screen or wants to see all UI elements, for example. The highlight mode functionality may involve receiving a selection of a UI element in the UI mapper and searching for the selected UI element in the screen for the former and/or receiving a selection of a screen and displaying each UI element found on the screen for the latter. In some embodiments, at least one new independent screen including one or more UI elements that are common in multiple screens of the application is created at 740.

In some embodiments, one or more containers for the screen are provided at 745. The one or more containers include a subset of the screen. A properties pane including properties of a selected application, screen, or UI element is displayed at 750. See FIG. 6B, for example. The one or more indicated UI elements are added to an object repository for subsequent reuse at 755.

If the user wants to move on to another screen of the application at 755, the user may put the UI mapper in navigate mode, select the next screen, return to recorder mode, and return to step 720 for that screen. In some embodiments, the user may select a different application and proceed to step 705 for that application. If no more screens or applications are to be viewed, the process then ends.

The process steps performed in FIG. 7 may be performed by a computer program, encoding instructions for the processor(s) to perform at least part of the process(es) described in FIG. 7 in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program for providing a user interface (UI) mapper configured to map UI elements embodied on a non-transitory computer-readable medium, the computer program configured to cause at least one processor to:
provide an interface facilitating indication of UI elements in a screen of an application;
receive one or more indications of the UI elements in the screen; and
include the one or more indicated UI elements in a UI tree of the application, wherein
the UI mapper is configured to operate in a live mode that provides the interface and receives the indications of the UI elements on the screen and in an offline mode where the UI mapper facilitates selection of different screens, and
the UI mapper, while in the live mode, prevents operation of the application, and the UI mapper, while in the offline mode, sends interactions to the application and prevents new UI elements from being added by indicating the new UI elements in the application.

2. The computer program of claim 1, wherein the live mode and the offline mode are mutually exclusive.

3. The compute program of claim 1, wherein the UI mapper is launched from a UI object browser of an RPA designer application.

4. The computer program of claim 1, wherein the UI mapper comprises a UI descriptors pane organized by one or more applications, one or more respective screens per application, and one or more respective UI elements per screen that are included in the UI tree.

5. The computer program of claim 1, wherein the computer program is further configured to cause the at least one processor to:
create a new application and screen in the UI tree when a user selects the new application.

6. The computer program of claim 1, wherein the computer program is further configured to cause the at least one processor to:
collect and store an application path and arguments for the application.

7. The computer program of claim 1, wherein the computer program is further configured to cause the at least one processor to:
create at least one new independent screen comprising one or more UI elements that are common in different screens of the application.

8. The computer program of claim 1, wherein the computer program is further configured to cause the at least one processor to:
run computer vision (CV) on the screen to automatically identify UI elements; and
provide one or more UI element suggestions using the automatically identified UI elements.

9. The computer program of claim 1, wherein the UI mapper comprises highlight functionality, and when the highlight functionality is enabled, the computer program is further configured to cause the at least one processor to:
receive a selection of a UI element in the UI mapper and search for the selected UI element in the screen, receive a selection of a screen and display each UI element found on the screen, or both.

10. The computer program of claim 1, wherein the computer program is further configured to cause the at least one processor to:
provide one or more containers for the screen, the one or more containers comprising a subset of the screen.

11. The computer program of claim 1, wherein the computer program is further configured to cause the at least one processor to:
add the one or more indicated UI elements to an object repository for subsequent reuse.

12. The computer program of claim 1, wherein the computer program is further configured to cause the at least one processor to:
display a properties pane comprising properties of a selected application, screen, or UI element.

13. The computer program of claim 12, wherein when a UI element is selected, the properties pane comprises properties of a target UI element and one or more UI descriptors for identifying the target UI element.

14. The computer program of claim 13, wherein the properties pane further comprises at least one anchor associated with the target UI element.

15. The computer program of claim 13, wherein the UI mapper, via the properties pane, is configured to facilitate removing anchors, deleting the target UI element, editing the one or more UI descriptors, editing a name and description of the target UI element, or a combination thereof.

16. A computer-implemented method for mapping user interface (UI) elements for robotic process automation (RPA), comprising:
providing an interface facilitating indication of UI elements in a screen of an application, by a UI mapper;
receiving one or more indications of the UI elements in the screen, by the UI mapper;
including the one or more indicated UI elements in a UI tree of the application, by the UI mapper; and
adding the one or more indicated UI elements to an object repository for subsequent reuse, by the UI mapper or a UI object browser, wherein
the UI mapper comprises a UI descriptors pane organized by one or more applications, one or more respective screens per application, and one or more respective UI elements per screen that are included in the UI tree, and
when a new application is selected via the UI mapper, a new application and screen are created in the UI tree.

17. The computer-implemented method of claim 16, wherein
the UI mapper is configured to operate in a live mode that provides the interface and receives the indications of the UI elements on the screen, and
the UI mapper is configured to operate in an offline mode where the UI mapper facilitates selection of different screens.

18. The computer-implemented method of claim 16, wherein the UI mapper comprises highlight functionality, and when the highlight functionality is enabled, the method further comprises:
receiving a selection of a UI element in the UI mapper and searching for the selected UI element in the screen, receiving a selection of a screen and displaying each UI element found on the screen, or both.

* * * * *